(12) United States Patent
Merwah

(10) Patent No.: US 7,282,942 B2
(45) Date of Patent: Oct. 16, 2007

(54) ENHANCED SAMPLING METHODOLOGY FOR SEMICONDUCTOR PROCESSING

(75) Inventor: Pushkar K. Merwah, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 11/268,236

(22) Filed: Nov. 7, 2005

(65) Prior Publication Data

US 2006/0044002 A1 Mar. 2, 2006

Related U.S. Application Data

(62) Division of application No. 10/711,201, filed on Sep. 1, 2004, now Pat. No. 6,998,867.

(51) Int. Cl.
*G01R 31/28* (2006.01)
*G06F 17/50* (2006.01)

(52) U.S. Cl. ............................. 324/765; 702/84; 716/4

(58) Field of Classification Search ................. None
See application file for complete search history.

(56) References Cited

U.S. PATENT DOCUMENTS

| | | | |
|---|---|---|---|
| 5,773,315 A | 6/1998 | Jarvis | 438/14 |
| 5,793,650 A | 8/1998 | Mirza | 702/34 |
| 6,265,232 B1 | 7/2001 | Simmons | 438/14 |
| 6,311,139 B1 * | 10/2001 | Kuroda et al. | 702/81 |
| 6,324,481 B1 | 11/2001 | Atchison et al. | 702/84 |
| 6,367,040 B1 | 4/2002 | Ott et al. | 714/724 |
| 6,496,958 B1 * | 12/2002 | Ott et al. | 716/4 |
| 6,707,936 B1 | 3/2004 | Winter et al. | 382/149 |
| 6,885,950 B2 | 4/2005 | Mitsutake et al. | 702/58 |

\* cited by examiner

*Primary Examiner*—Ernest Karlsen
(74) *Attorney, Agent, or Firm*—Lisa U. Jaklitsch; Yuanmin Cai

(57) ABSTRACT

The present invention improves wafer sampling methods by partitioning a semiconductor wafer into a set of sampling regions and calculating yield of a sampling region(s) of the semiconductor wafer.

13 Claims, 4 Drawing Sheets

ENHANCED SAMPLING METHODOLOGY FOR SEMICONDUCTOR PROCESSING

CROSS REFERENCE TO RELATED PATENT APPLICATION

This patent application is a divisional of U.S. patent application Ser. No. 10/711,201, entitled "Enhanced Sampling Methodology for Semiconductor Processing" filed on Sep. 1, 2004 now U.S. Pat. No. 6,998,867.

FIELD OF THE INVENTION

The present invention relates generally to semiconductor wafers, and more particularly to an enhanced sampling method for semiconductor wafers.

BACKGROUND OF THE INVENTION

Prior to shipment, a sampling of semiconductor wafers is tested for satisfaction of performance requirements of the die on the wafer. In accordance with prior art sampling methods, if the predicted yield of the entire semiconductor wafer does not meet yield requirements, the entire wafer, lot of wafers, e.g. batch, or even shipment of wafers will be labeled as "bad," discarded, and not shipped. Prior art semiconductor wafer sampling methods are fraught with problems.

Prior art sampling methods waste fabrication resources, which consequently results in delayed or cancelled semiconductor shipments, by incorrectly presuming a random distribution of failures, e.g. bad die, on a semiconductor wafer. Because prior art sampling methods presume a random bad die distribution, if bad die are sampled, the entire semiconductor wafer, or worse yet lot or shipment, is labeled as "bad," discarded, and not shipped.

Moreover, prior art sampling methods are inefficient, which also results in delayed or discarded semiconductor shipments. Because prior art sampling methods are time consuming, only a small population of semiconductor wafers, such as a single wafer or batch, is tested for predicted yield. One problem associated with such method is that such a small population rarely represents the predicted yield of an entire lot or shipment, which in turn leads to misguided shipment decisions based upon a misrepresented population of wafers.

Therefore, there remains a need in the art for an improved method for sampling semiconductor wafers, which improves the overall yield of the semiconductor processing line from semiconductor fabrication to shipment.

These and other deficiencies in the prior art are overcome through the present invention.

BRIEF SUMMARY OF THE INVENTION

The present invention is directed to a method and program for sampling semiconductor wafers. Accordingly to the present invention, the semiconductor wafer comprises a set of sampling regions. The present invention then calculates the yield for at least one sampling region in the set of sampling regions. Based upon the calculated yield for at least one sampling region, the present invention predicts yield of the semiconductor wafer and/or adjusts the boundaries of the at least one sampling region such that the adjusted sampling region predicts a higher or lower yield for the semiconductor wafer.

The present invention saves semiconductor fabrication costs as well as improves fulfillment. The present invention presumes that bad die appear in grouped and generally isolated regions on the semiconductor wafer. Once a bad die is found, the present invention determines the boundaries of the bad die distribution and salvages the semiconductor wafer for the sampling regions with good die. Accordingly, semiconductor wafers that were labeled as bad and discarded using prior art methods are identified with good regions and salvaged for the same. In so doing, the present invention saves fabrication costs because fewer new semiconductor runs must be initiated. In addition, the present invention reduces shipment delays and cancellations because the present invention frees more semiconductors for commercial distribution.

Furthermore, the present invention improves the overall efficiency of semiconductor wafer testing. The present invention bypasses regions of the semiconductor wafers that are labeled "bad" in future tests. The present invention flags correction of the processing conditions that created the regions of bad die. Finally, the present invention predicts the outgoing quantity of good die and, if the prediction indicates failure to satisfy shipment commitments, initiates new wafer runs.

For at least the foregoing reasons, the present invention improves upon the overall yield of the semiconductor processing line from semiconductor fabrication to shipment.

BRIEF DESCRIPTION OF THE FIGURES

The features and the element characteristics of the invention are set forth with particularity in the appended claims. The figures are for illustrative purposes only and are not drawn to scale. Furthermore, like numbers represent like features in the drawings. The invention itself, however, both as to organization and method of operation, may best be understood by reference to the detailed description which follows, taken in conjunction with the accompanying figures, in which:

DETAILED DESCRIPTION OF THE PREFERRED EMBODIMENTS

The invention will now be described with reference to the accompanying figures. In the figures, various aspects of the structures have been shown and schematically represented in a simplified manner to more clearly describe and illustrate the invention.

By way of overview and explanation, the present invention comprises a software program that calculates yield for a sampling region on a semiconductor wafer and based upon the calculated yield predicts yield of the semiconductor wafer and/or adjusts the boundary of at least one sampling region such that the adjusted sampling region predicts a higher or lower yield for the semiconductor wafer. Some sampling regions comprise shapes such as, but not limited to, quadrants, pie slices and rings, which can be symmetrical or asymmetrical. The software program iteratively chooses sampling region boundaries based upon a nearest neighbor approach such that the finally selected sampling region boundary encapsulates the maximum number of good die. Finally, the software program identifies bad sampling regions, i.e. the outer periphery of the semiconductor wafer that often contains partial die, from the beginning and automatically excludes such from wafer test runs.

In-line testable structures test the die in predetermined quantities and locations on the semiconductor wafer. Often the in-line testable structure test not each die, but instead a representative sampling of die. In accordance with the present invention, the software assigns the test data to a sampling region. The software then calculates the yield for the die in the assigned sampling region. Based upon the calculated yield for the sampling regions, the present invention either predicts the yield of the semiconductor wafer and/or adjusts the boundary of the sampling region such that the adjusted sampling region predicts either a higher or lower yield for the semiconductor wafer. Based upon such calculations, the software program identifies combinations of regions that have the highest predicted yield, suggests process modifications, and initiates new semiconductor wafer runs to satisfy shipment fulfillment.

Figure 1:
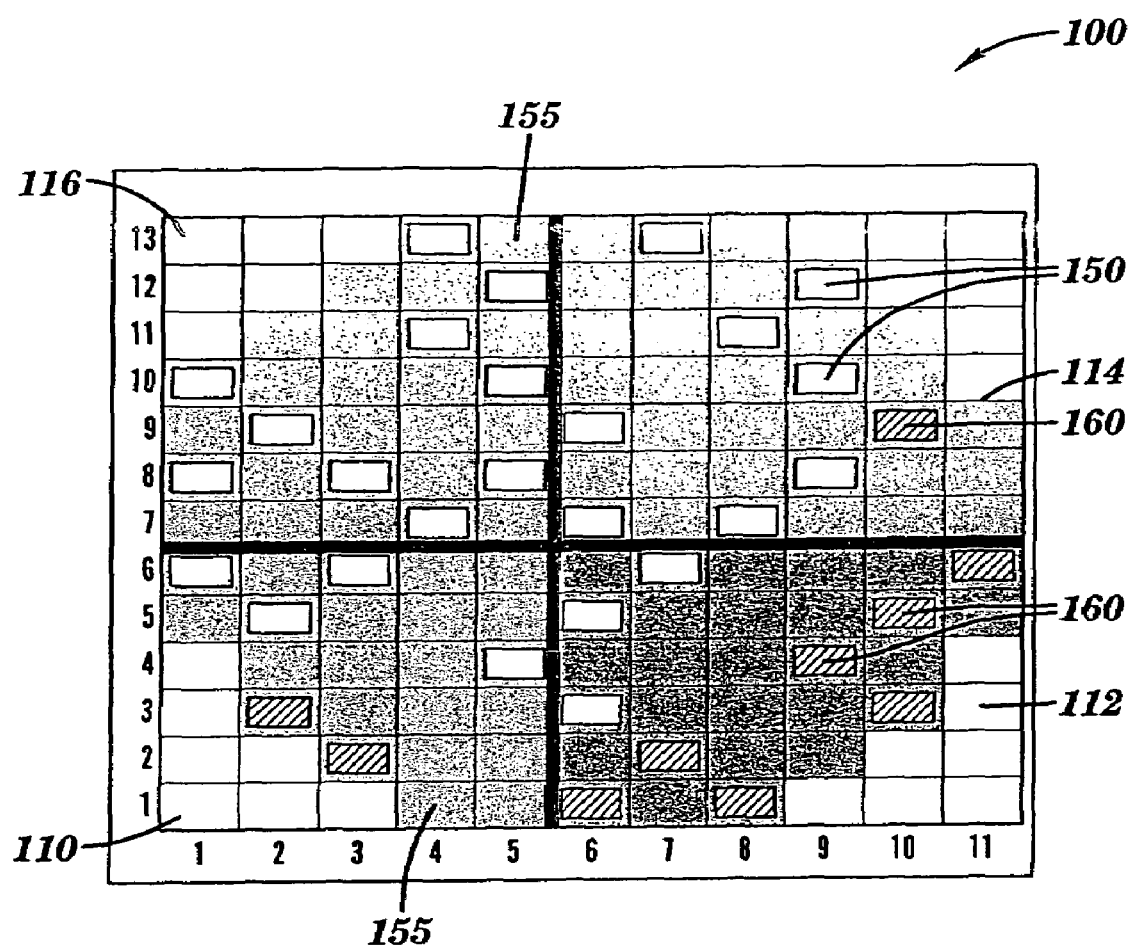
FIG. 1 depicts a semiconductor wafer partitioned into a four quadrant sampling region in accordance with the present invention.

FIG. 1 depicts a semiconductor wafer 100 partitioned into four quadrant sampling regions. The description below describes the situation where each sampling region has at least one tested die. It being understood, however, that each sampling region must not have a tested die. For example some sampling regions such as the outer periphery of the semiconductor wafer are known to have bad die. Accordingly, in such sampling regions the die must not be tested, but instead would be presumed bad. While all sampling regions have tested die in FIG. 1, not every die has been tested in any sampling region. Die 155 represents an untested die, while die 150 and 160 represent bad and good die respectively. FIG. 1 depicts a wafer with a representative sampling of tested die.

With continued reference to FIG. 1, contrary to prior art knowledge, bad die 150 are not randomly distributed on the semiconductor wafer. With respect to the top half of the semiconductor wafer 100, the fourth sampling region 116 comprises only bad die, while the third sampling region 114 comprises eight bad die and one good die 160. Therefore, the top half of the semiconductor wafer with sampling regions 114, 116 comprises only one good die. With respect to the bottom half of the semiconductor wafer, the first sampling region 110 comprises only four bad die and two good die, while the second sampling region 112 comprises only three bad die and seven good die. Clearly, the bottom half of the wafer contains the most good die. In accordance with the inventive method of the present invention, the bottom half would be the recommended salvaged region of the wafer. Even with the improved sampling of the present invention, however, one good die 160 will be discarded.

Figure 2:
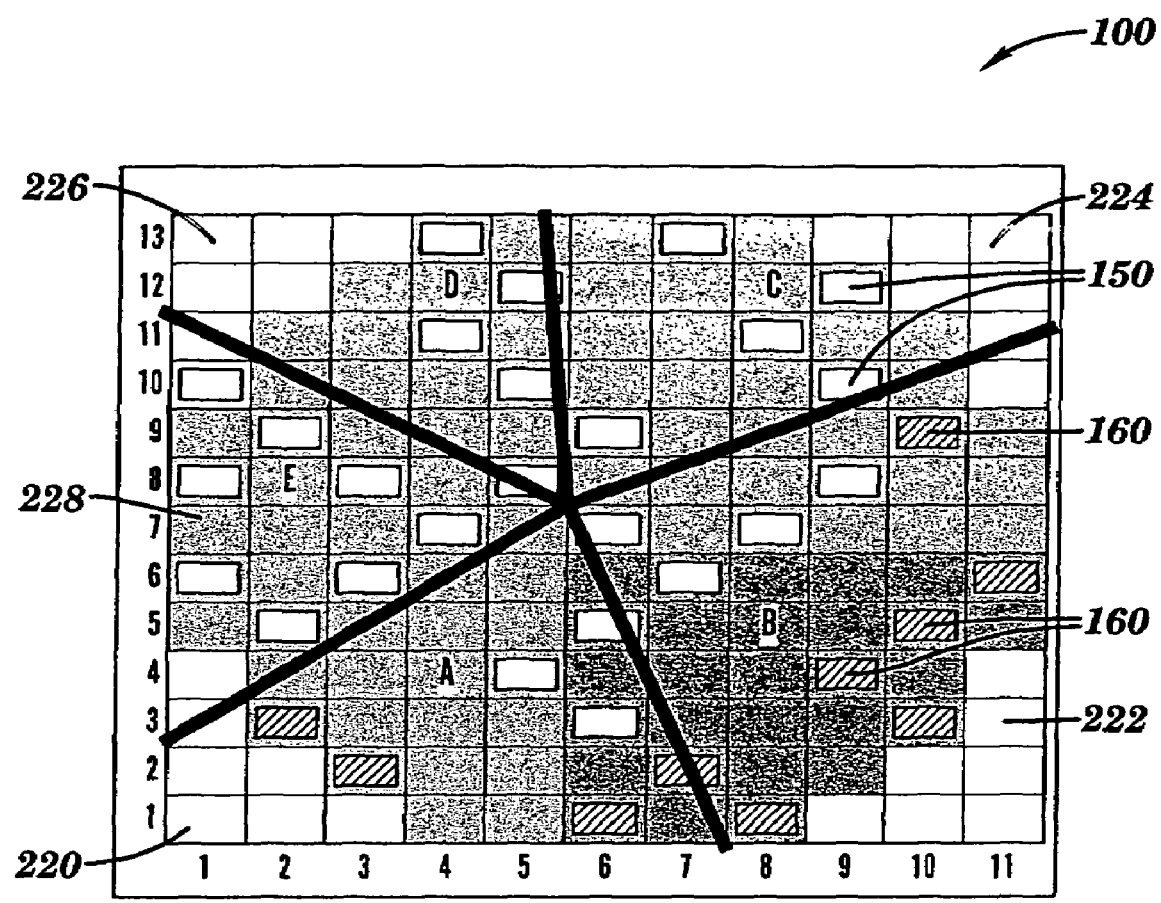
FIG. 2 depicts the same semiconductor wafer of FIG. 1 with adjusted sampling region boundaries in accordance with the present invention.

FIG. 2 depicts the same semiconductor wafer 100 of FIG. 1 with adjusted sampling region boundaries 220, 222, 224, 226, and 228 in accordance with a further embodiment of the present invention. Note that the same number of good and bad die are present on the semiconductor wafer 100, however in accordance with the present invention, the boundaries of the sampling regions have been adjusted. The software program recognized that at least one good die 160 could be salvaged in the upper right hand sampling region of the semiconductor wafer and iteratively moved the boundaries of the sampling regions to encapsulate the good die. Accordingly, based upon this adjusted boundary approach, if the sampling regions 220, 222 are salvaged, only bad die are discarded.

Figure 3:
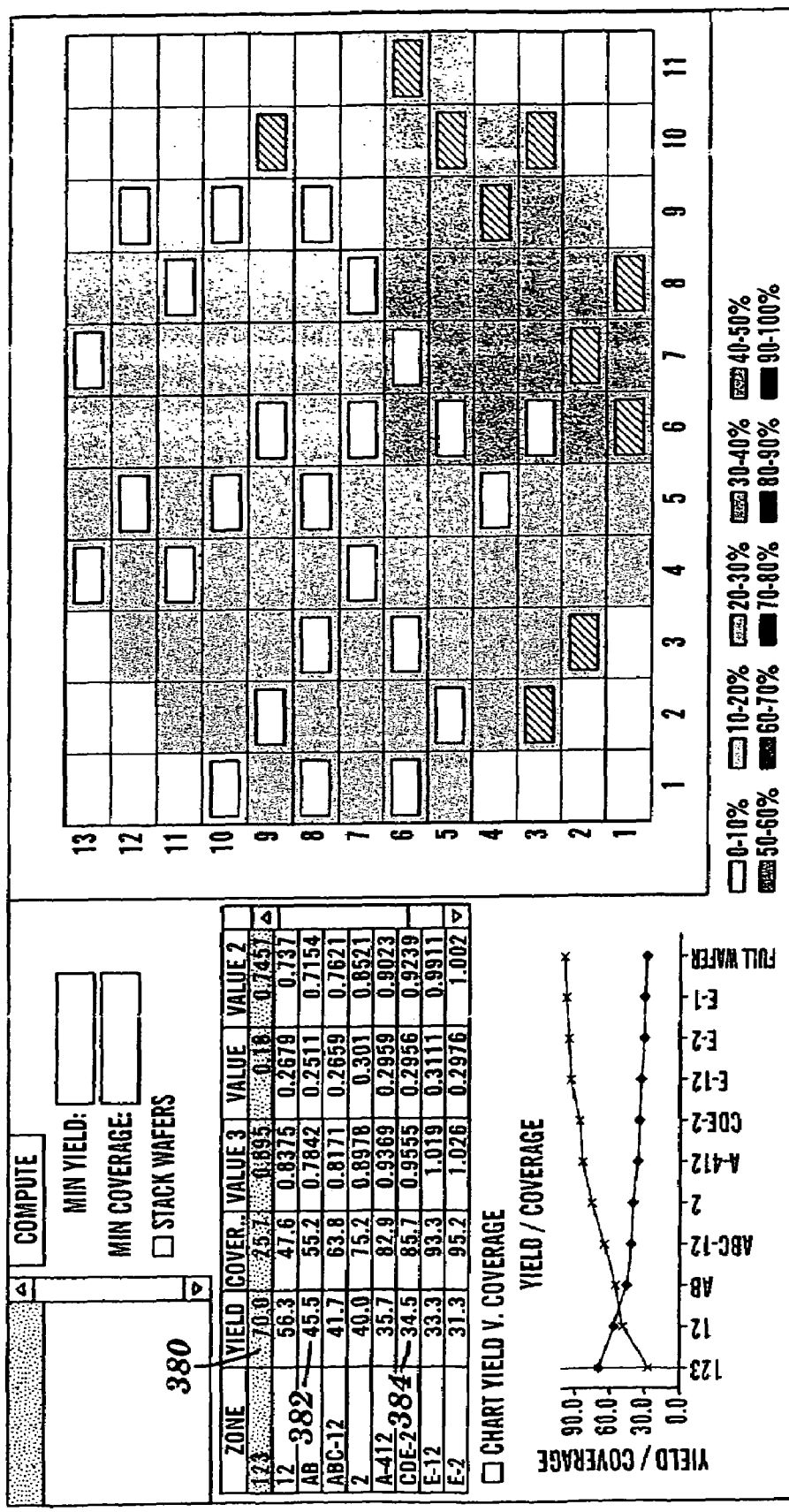
FIG. 3 illustrates the statistical yield prediction of the present invention for the semiconductor wafer depicted in FIGS. 1-2; and, FIG. 4 illustrates the semiconductor wafer partitioned into overlaying circular and pie shaped sampling regions in accordance with the present invention.

FIG. 3 illustrates the statistical yield prediction of the present invention for the semiconductor wafer 100 depicted in FIGS. 1 and 2. The predicted yield 380 for the combination of the first, second, and third quadrants 110, 112, 114 of FIG. 1 is 70%. With reference to FIG. 2, the predicted yield 382 for the combination of the first and second slice 220, 222 is 45.5%. The software of the present invention also calculates yield capacities for a combination of sampling region types. As shown in FIG. 3, the predicted yield 384 for the combination of the third, fourth, and fifth slices 224, 226, 228 along with the second quadrant 112 is 34.5%

FIG. 1 depicts the predefined shape sampling method of the present invention, however as detailed above the present invention further comprises a dynamically chosen sampling region based upon a nearest neighbor method. In accordance with this method, a first region is tested for predicted yield. Next, a region neighboring that first region is tested for predicted yield. If the neighboring region has predicted yield characteristics similar to the first region, the first region expands to include that neighboring sampling region. Otherwise, the first region excludes the neighboring sampling region and chooses another neighboring sampling region for predicted yield comparison. In so doing, the present invention dynamically chooses sampling regions.

Figure 4:
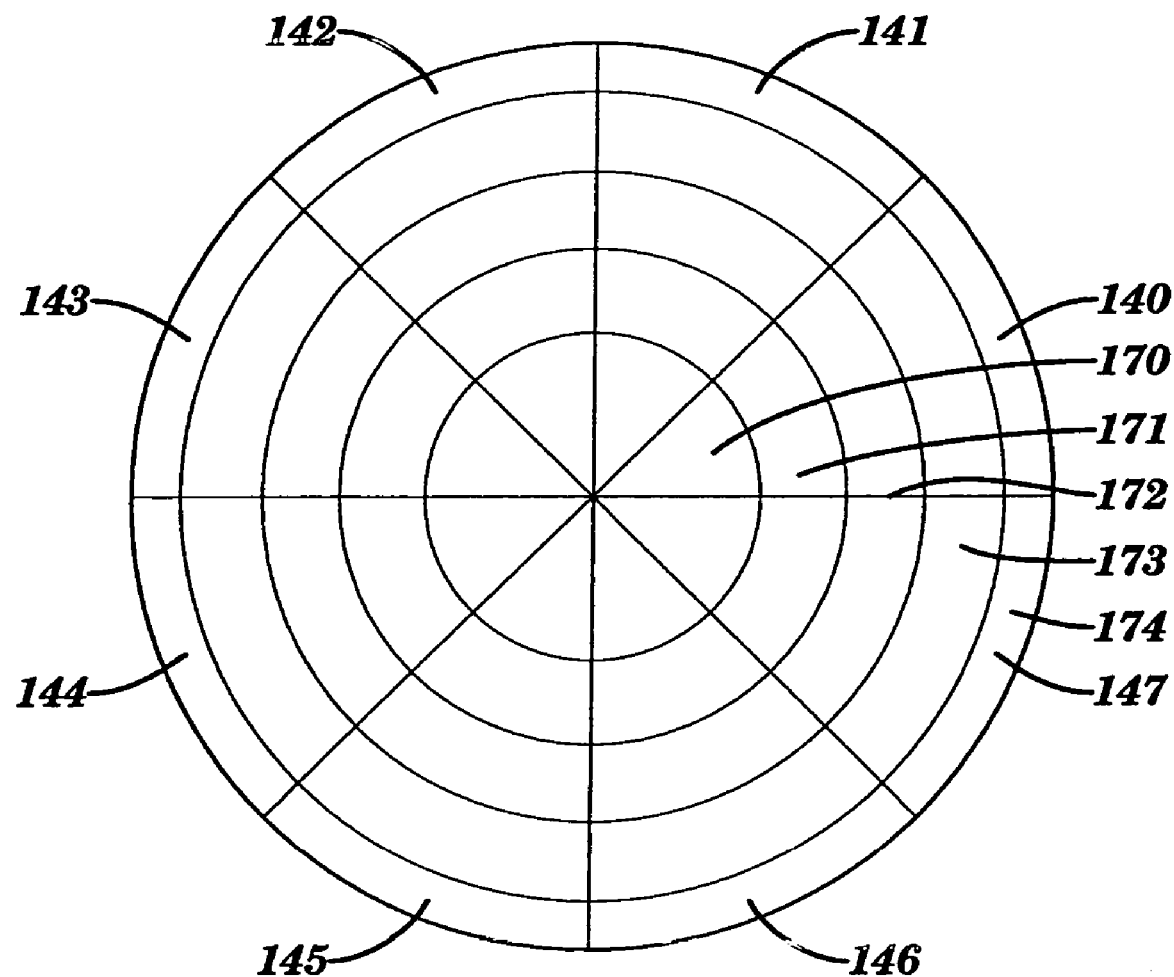

FIG. 4 illustrates the semiconductor wafer partitioned into overlaying circular and pie shaped sampling regions in accordance with the preferred embodiments of the present invention. It should be understood, that while the five circular sampling regions 170-174 and eight pie shaped sampling regions 140-147 are symmetrical, asymmetrical shapes are also within the spirit and scope of the present invention. The present invention calculates yield for any combination of pie shaped and/or circular sampling region. If a particular combination, such as for example circular sampling region 170 in combination with pie shaped sampling regions 144 and 145 predicted the most number of good die, such combination would be identified as the sampling region from which the die should be cut for shipment.

With continued reference to the nearest neighbor method of the present invention and FIG. 4, if the present invention tests sampling region 174, which represents the outer periphery of the semiconductor wafer, and as is common with the outer periphery of a semiconductor wafer determines that the die are partial, and accordingly bad, the present invention would test the nearest neighbor, or in other words sampling region 173. Sampling region 173 represents the ring closest to the outer periphery. If the present invention determines that the sampling region 173 has a similar deficient calculated yield, sampling regions 173 and 174 would be combined. Future testing of the combined sampling region 173 and 174 could then be prevented. Alternatively, die from the combined sampling regions 173 and 174 would be automatically discarded.

Once the present invention has calculated the yield for a given sampling as well as either identified the combination of sampling regions that maximizes predicted yield for the semiconductor wafer, such information can be used to predict semiconductor lot, and better still semiconductor shipment yield. If the predicted semiconductor lot or shipment yield does not meet a predetermined criteria, the present invention can initiate new semiconductor wafer runs. Alternatively, if the predicted semiconductor lot or shipment does not meet the predetermined criteria, the present invention can alter semiconductor fabrication process conditions.

While the present invention has been particularly described in conjunction with a specific preferred embodiment and other alternative embodiments, it is evident that numerous alternatives, modifications and variations will be apparent to those skilled in the art in light of the foregoing description. It is therefore intended that the appended claims embrace all such alternatives, modifications and variations as falling within the true scope and spirit of the present invention.

What is claimed is:

1. A method for predicting semiconductor yield, comprising the steps of:
   calculating yield for a first sampling region in a set of sampling regions on a semiconductor wafer;
   calculating yield for a second sampling region in said set of sampling regions on said semiconductor wafer, said second sampling region neighboring said first sampling region; and,
   predicting yield of a semiconductor wafer based upon at least said calculated yield of said first and said second sampling region.

2. A method as in claim 1, further comprising, the step of:
   partitioning a semiconductor wafer into a set of sampling regions, prior to said calculating yield for a first sampling region step, said set comprising at least two sampling regions.

3. A method as in claim 1, wherein at least one sampling region comprises a shape of at least one of a quadrant, a slice, and a ring.

4. A method as in claim 1, wherein said at least one sampling region on said semiconductor wafer comprises at least one die and said calculating yield for a first sampling region step further comprises:
   testing said at least one die in said at least one sampling region; and,
   determining said calculated yield of said at least one sampling region based upon results of said testing step.

5. A method as in claim 1, further comprising, the steps of:
   comparing said calculated yield of said first sampling region with said calculated yield of said second sampling region; and,
   subsuming said second sampling region into said first sampling region whenever said calculated yield of said first sampling region is substantially similar to said calculated yield of said second sampling region.

6. A method as in claim 5, wherein said predicting step further comprises, the step of:
   predicting yield of said semiconductor wafer based upon said first sampling region with said subsumed second sampling region whenever said predicted yield of said first sampling region is substantially similar to said predicted yield of said second sampling region.

7. A method as in claim 1, further comprising, the steps of:
   comparing said calculated yield of said at least one sampling region with a target yield for said sampling region; and
   discontinuing further testing of said at least one sampling region, whenever said calculated yield does not substantially equal said target yield.

8. A method as in claim 1, further comprising, the step of:
   repeating said calculating yield for a first sampling region, said calculating yield for a second sampling region, and said predicting steps for a predetermined number of semiconductor wafers.

9. A method as in claim 8, further comprising, the step of:
   predicting total yield for said predetermined number of semiconductor wafers.

10. A method as in claim 9, further comprising, the step of:
    comparing said predicted total yield for said predetermined number of semiconductor wafers with a target yield for said predetermined number of semiconductor wafers.

11. A method as in claim 10, further comprising, the step of:
    initiating a semiconductor wafer fabrication run whenever said predicted total yield does not satisfy said target yield for said predetermined number of semiconductor wafers.

12. A method as in claim 10, further comprising, the step of:
    altering at least one semiconductor fabrication process condition whenever said predicted total yield for said predetermined number of semiconductor wafers does not satisfy said target yield for said predetermined number of semiconductor wafers.

13. A computer software program adapted to execute a method comprising the steps of:
    calculating yield for a first sampling region in a set of sampling regions on a semiconductor wafer;
    calculating yield for a second sampling region in said set of sampling regions on said semiconductor wafer, said second sampling region neighboring said first sampling region; and,
    predicting yield of a semiconductor wafer based upon at least said calculated yield of said first and said second sampling region.

* * * * *